United States Patent [19]

Hoshino et al.

[11] Patent Number: 5,739,517
[45] Date of Patent: Apr. 14, 1998

[54] APPARATUS AND A METHOD FOR CHECKING AN OBJECT TO BE CHECKED FOR AUTHENTICITY

[75] Inventors: Hidekazu Hoshino, Yokohama; Masumi Yoda, Zushi; Minoru Komiya, Yokohama, all of Japan

[73] Assignee: NHK Spring Co., Ltd., Yokohama, Japan

[21] Appl. No.: 591,091

[22] Filed: Jan. 25, 1996

[30] Foreign Application Priority Data

Jan. 27, 1995 [JP] Japan ................... 7-011839

[51] Int. Cl.$^6$ ................................. G06K 7/08
[52] U.S. Cl. ......................... 235/449; 235/493
[58] Field of Search ................... 235/449, 450, 235/493

[56] References Cited

U.S. PATENT DOCUMENTS

| | | |
|---|---|---|
| 4,120,011 | 10/1978 | Kolb, Jr. . |
| 4,450,348 | 5/1984 | Stockburger et al. . |
| 4,806,740 | 2/1989 | Gold et al. . |
| 4,820,912 | 4/1989 | Samyn . |
| 5,180,903 | 1/1993 | Shigeno et al. ............... 235/449 |
| 5,289,122 | 2/1994 | Shigeno . |
| 5,451,759 | 9/1995 | Hoshino et al. ............... 235/449 |
| 5,473,147 | 12/1995 | Hoshino et al. . |

FOREIGN PATENT DOCUMENTS

5-4307   1/1993   Japan .

*Primary Examiner*—F. L. Evans
*Attorney, Agent, or Firm*—Frishauf, Holtz, Goodman, Langer & Chick

[57] ABSTRACT

A large number of magnetic pieces are distributed at random in a scanning region of an object to be checked. A magnetic sensor of a processing apparatus for checking the object for authenticity comprises first and second detecting element pairs. Each of these detecting element pairs include a pair of MR elements arranged in a scanning direction. The MR elements of the second detecting element pair are deviated from those of the first detecting element pair in parallel relation. The apparatus registers data associated with the detection signal obtained by means of the first detecting element pair in a code indicator section of the object when the object is manufactured or issued. The apparatus is provided with a circuit which collates all the detection signals obtained by means of the detecting element pairs with the data registered in the code indicator section, in checking the object for authenticity, and concludes that the object is real if any of the detection signals corresponds to the data in the code indicator section.

4 Claims, 5 Drawing Sheets

APPARATUS AND A METHOD FOR CHECKING AN OBJECT TO BE CHECKED FOR AUTHENTICITY

BACKGROUND OF THE INVENTION

1. Field of the Invention

The present invention relates to an apparatus and a method for checking objects to be checked for authenticity, such as important documents, securities, paper money, checks, traveler's checks, ID cards, CD cards, credit cards, passports, art objects, betting tickets for publicly-managed gambling, etc.

2. Description of the Related Art

As is described in Jpn. UM Appln. KOKAI Publication No. 5-4307, an apparatus for magnetically scanning a scanning region is proposed as means for checking documents or the like for authenticity. The apparatus of this type comprises magneto-resistance effect elements (MR elements) which serve as a sensor. Detection signals having proper waveforms corresponding to magnetic pieces in an object to be checked are obtained by detecting the magnetic pieces by means of the MR elements. In the conventional sensor, which includes the MR elements and a magnet, the object is moved relatively to the MR elements in a manner such that external magnetic fields generated by the magnet are applied to the MR elements. The MR elements electrically seize a magnetic flux change which is caused as the magnetic pieces in the scanning region pass by the MR elements.

The reproducibility of the detection signals is an essential factor in magnetically scanning the object to be checked by means of the processing apparatus which is provided with the MR elements. Here the reproducibility implies the continual possibility to obtain substantially the same detection signals when the same object is detected repeatedly. If the reproducibility is low, real objects may be concluded to be false in some cases, so that the detection is not very reliable.

Theoretically, the same detection signals should always be obtained if the same scanning region is detected by means of the same sensor. Actually, however, the position of the object relative to the same sensor may possibly be deviated in a direction perpendicular to the scanning direction, so that the same detection signals cannot always be detected. In the case where the processing apparatus used to manufacture or issue the object (for data registration) is different from the one used to collate the object (for checking), in particular, the sensor position sometimes may vary according to the processing apparatus due to errors in sensor attachment. Accordingly, it is hard to obtained perfect reproducibility.

In the case of a sensor which uses MR elements with a length of about 3 mm, for example, reproducibility of a practicable level can be enjoyed if the position deviation in the direction perpendicular to the scanning direction is not greater than 0.3 mm. In manufacturing the conventional processing apparatuses, therefore, the sensor position must be controlled with high accuracy such that its deviation is within the aforesaid allowable range (0.3 mm), thus entailing a substantial increase in manufacturing cost.

SUMMARY OF THE INVENTION

Accordingly, the object of the present invention is to provide an apparatus and a method for checking an object, in which detection signals for a scanning region can be accurately reproduced without regulating the sensor position with high accuracy.

In order to achieve the above object, according to the present invention, there is provided an apparatus for checking an object to be checked for authenticity, the object having a scanning region in which a large number of magnetic pieces of a magnetic material are distributed at random in a base of a nonmagnetic material, the apparatus comprising a sensor for magnetically detecting the magnetic pieces, the sensor having a first detecting element pair including a pair of magneto-electric transducers arranged adjacent to each other so that longitudinal center lines thereof cross a line along which the magnetic pieces in the scanning region are scanned, and a second detecting element pair including a pair of magneto-electric transducers arranged in the vicinity of the first detecting element pair so that the second detecting element pair is deviated from the first detecting element pair in parallel relation.

Preferably, the magneto-electric transducers used in the detecting element pairs are magneto-resistance effect elements (MR elements) whose resistances vary substantially in proportion to the intensity of magnetic fields. Since it is necessary only that the electrical characteristics, such as the resistances, of the transducers change depending on the intensity of the magnetic fields, magnetic diodes or Hall elements may, for example, be used in place of the MR elements. In the case where the MR elements are used, it is advisable to adjust the distance of deviation of the second detecting element pair from the first detecting element pair, in the direction parallel to each element, to 7% to 20% of the length of each MR element.

According to the invention, moreover, there is provided an apparatus which comprises the aforesaid sensor, transfer means for relatively moving the object in the scanning direction, magnetic field generating means for applying magnetic fields to the first and second detecting element pairs, a detecting circuit for detecting changes of electrical outputs produced in the individual detecting element pairs and obtaining detection signals as the magnetic pieces in the scanning region pass by the detecting element pairs, switching means for delivering a detection signal from the first detecting element pair into the detecting circuit when issuing the object to be checked and delivering detection signals from the first and second detecting element pairs into the detecting circuit when collating the object, code write means for recording data associated with the detection signal from the first detecting element pair in a code indicator section, read means for reading the data from the code indicator section, and means for collating the data of the code indicator section read by the read means with the detection signals from the first and second detecting element pairs and concluding that the object to be checked is real if any of the detection signals corresponds to the data of the code indicator section.

In the apparatus of the present invention, when the scanning region of the object to be checked is moved relatively to the sensor, magnetic fluxes which pass through the MR elements change depending on the distribution of the magnetic pieces and the like, so that the resistances of the MR elements change with time. Accordingly, there is a difference between the respective outputs of the MR elements, and it is delivered as a detection signal. This detection signal varies with every infinitesimal portion of the scanning region, depending on the distribution density, size, or direction of orientation of the magnetic pieces, so that each scanning region has its proper output pattern.

In the manufacturing process for manufacturing and issuing the object to be checked, the scanning region is scanned by using the first detecting element pair. A detection signal obtained by this scanning is enciphered according to specific rules, and is recorded in the code indicator section of the object or a host computer. In a collating process for checking the object for authenticity, a detection signal is obtained by scanning the scanning region by means of all the detecting element pairs. Detection signals obtained by this scanning are compared with the data recorded in the code indicator section. If the difference of at least one of these detection signals from the data in the code indicator section is within an allowable range, the object is concluded to be real.

According to this arrangement, the allowable deviation range for the sensor in the collating process is wider than in the case of the conventional apparatuses. Accordingly, high reproducibility can be secured for the detection signals without regulating the sensor position with high accuracy. In other words, the object can be checked for authenticity with high reliability even in case different processing apparatuses are used for manufacturing or issuing the object and for collating the object. Since the sensor position need not be regulated so accurately as in the conventional case, moreover, the processing apparatus can be assembled with ease, and its cost can be lowered.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Referring now to FIGS. 1 to 7, an embodiment of the present invention will be described in detail.

Figure 4:
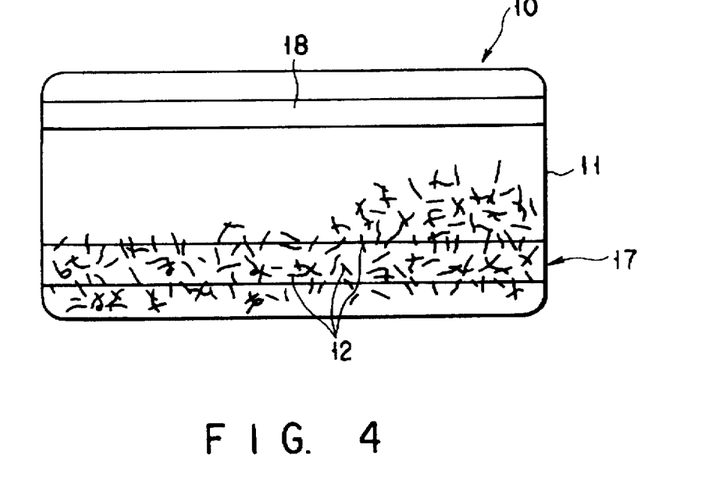
FIG. 4 is a plan view schematically showing an example of a card-type object to be checked.

As shown in FIG. 4, a large number of magnetic pieces 12 are distributed at random in a base 11 of an object 10 to be checked so that they point in many and unspecified directions. The base 11 is formed of a nonmagnetic material such as paper or plastics.

High-permeability materials, such as permalloy, sendust, soft ferrite, Co-based amorphous, Fe-Ni alloy, etc., may be suitably used for the magnetic pieces 12. The cross section of each magnetic piece 12 is not limited to a circular shape, and may, for example, be in a polygonal, rectangular, oval, or some other shape. Although the magnetic pieces 12 are in the form of wires as illustrated, they may be in the form of flakes or powder. Alternatively, the pieces 12 may be a mixture of wires, flakes, and powder. Alternatively, moreover, the magnetic pieces 12 may be fibrous or strip-shaped magnetic polymer pieces which are formed by distributing a large number of magnetic powder particles in a high-molecular material such as acrylic resin.

The diameter (for the case of wires or fibers) or width (for the case of flakes or strips) of the magnetic pieces 12, which depends on the size of the object 10 to be checked, ranges from about 5 to 100 μm, and the length ranges from about 1 to 30 mm, for example. In manufacturing the object 10, the magnetic pieces 12 are distributed at random in a specific scanning region 17 so that they are contained in the object 10 with a certain density.

The object 10 is provided with a code indicator section 18. Proper information corresponding, for example, to the state of distribution of the magnetic pieces 12 in the scanning region 17 is enciphered by a processing apparatus 20 illustrated in FIG. 5, and is registered in the indicator section 18.

The processing apparatus 20 is provided with a housing 25 and a transfer mechanism 26. In the transfer mechanism 26, a transfer member 27, which is formed of a belt, rollers, etc., moves the object 10 at a predetermined speed in the direction indicated by arrow F in FIG. 5.

Figure 1:
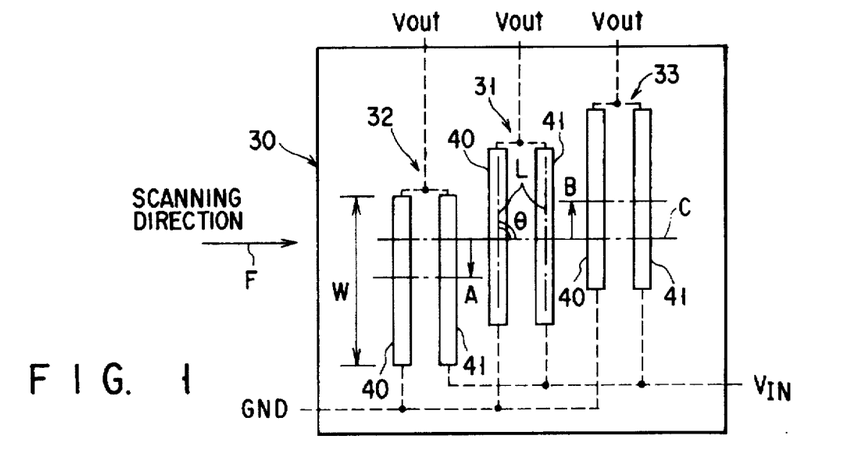
FIG. 1 is a plan view of a sensor of a processing apparatus according to an embodiment of the present invention.
Figure 5:
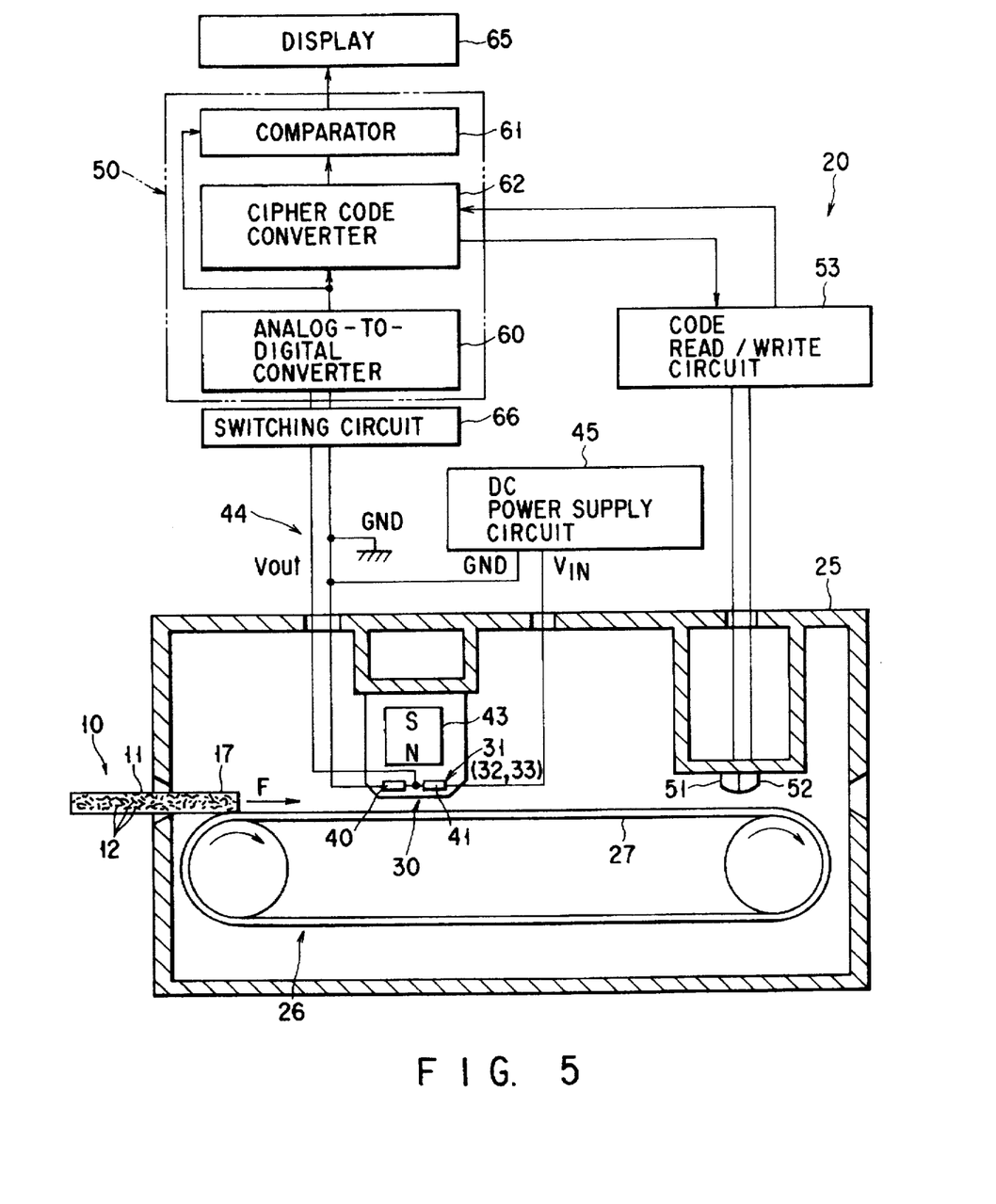
FIG. 5 is a side view, partially in section, showing an outline of the processing apparatus with the sensor shown in FIG. 1.

A magnetic sensor 30 is located in the middle of the path of transfer of the object 10 to be checked. As shown in FIG. 1, the sensor 30 includes a first detecting element pair 31 situated substantially on a center line C which extends in the width direction of the sensor 30. The detecting element pair 31 is composed of MR elements 40 and 41 for use as magneto-electric transducers. The MR elements 40 and 41, which have an elongated form along a longitudinal center line L each, are arranged parallel to each other so that their respective center lines L cross a line along the scanning direction F (θ=90°±45° in FIG. 1). The MR elements 40 and 41 need not be straight ones as shown in FIG. 1. They may be bent at the middle portion, may be arcuate or may be wavy.

Further, the sensor 30 includes two second detecting element pairs 32 and 33. These second pairs 32 and 33 are constituted substantially in the same manner as the first detecting element pair 31. More specifically, the one second detecting element pair 32 is composed of a pair of MR elements 40 and 41 which are arranged substantially at right angles to the scanning direction F. These elements 40 and 41 are deviated at a distance A in their extending direction from the elements 40 and 41 of the first detecting element pair 31 in parallel relation. The other second detecting element pair 33 is also composed of a pair of MR elements 40 and 41 which are arranged substantially at right angles to the scanning direction F. These elements 40 and 41 are deviated at a distance B from the elements 40 and 41 of the first element pair 31 on the side opposite to the element pair 32. The MR elements 40 and 41 have the same length W, which may, for example, be 3 mm.

Figure 3:
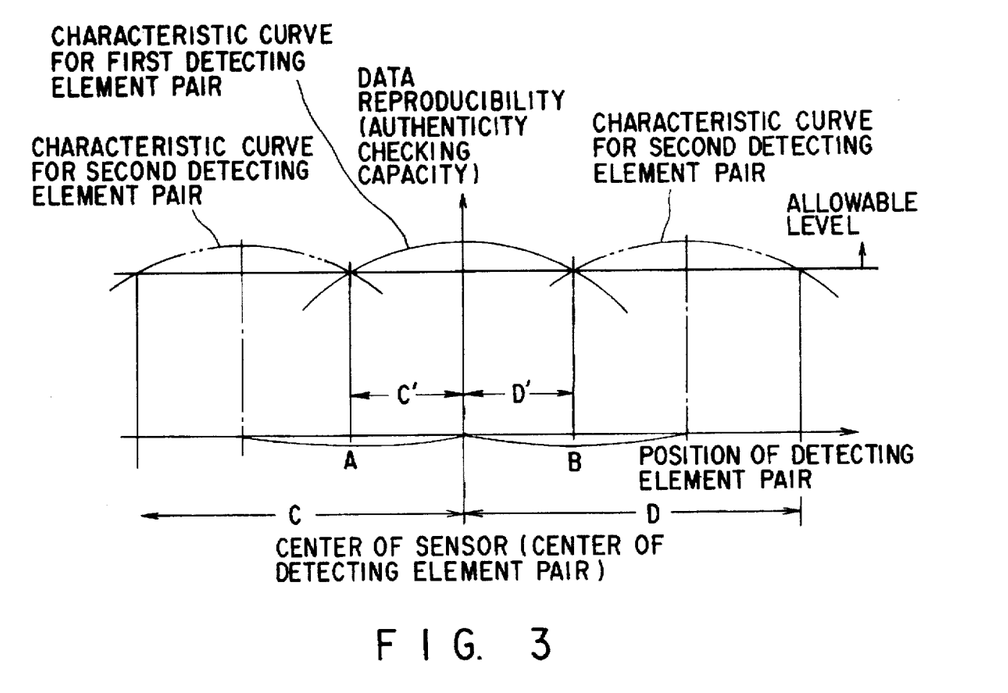
FIG. 3 is a diagram showing the relationship between the position of detecting element pairs shown in FIG. 1 and data reproducibility.

The apparatus 20, which comprises the first detecting element pair 31 on the center line C in the width direction of the sensor 30 and the two second detecting element pairs 32 and 33 deviated from the first pair 31 in parallel relation, can extend the ranges (allowable deviation ranges C and D) for the reproducibility of an allowable level and above by margins equivalent to the distances A and B at which the second detecting element pairs are deviated, as shown in FIG. 3. In the case where the length of the MR elements used was 3 mm, for example, the allowable ranges C' and D' obtained with use of the first detecting element pair 31 only was able to be extended by about ±0.3 mm. When the second detecting element pairs 32 and 33 were arranged with deviations of about 20% (0.6 mm) of the element length W in the directions A and B from the first element pair 31, as in the present embodiment, on the other hand, the ranges C and D for the reproducibility of the allowable level and above was able to be extended by ±0.9 mm.

Suitably, the distances A and B at which the second detecting element pairs 32 and 33 are deviated from the first detecting element pair 31 are adjusted to 7% to 20% of the element length W. If the deviation distances A and B are shorter than 7% of the element length W, the margins for the extension of the allowable ranges are not long enough. If the deviation distances exceed 20%, on the other hand, the allowable-level reproducibility may not be able to be obtained, depending on the dislocation of the sensor. The allowable ranges may be further extended by providing three second detecting element pairs or more.

The MR elements 40 and 41 are magneto-resistance effect elements whose electric resistances vary depending on the intensity of magnetic fields. Based on required specifications, these elements may be ones which are formed of a compound semiconductor, such as indium antimony or gallium arsenide, and have positive magnetic characteristics, or ones which are formed of a ferromagnetic substance, such as nickel-cobalt or permalloy, and have negative magnetic characteristics. A magnet 43 for use as magnetic field generating means is located behind the detecting element pairs 31, 32 and 33. The magnet 43 may be a permanent magnet or an electromagnet which includes a magnetic coil.

The MR elements 40 and 41, as represented by those of the first detecting element pair 31 shown in FIG. 5, are connected electrically to each other, and are subjected to magnetic fields of the same intensity by the magnet 43. The one MR element 40 is connected to a controller 50 (mentioned later) through a detecting circuit 44. The other MR element 41 is connected to a DC power circuit 45. The scanning region 17 is moved in the direction (indicated by arrow F) in which the MR elements 40 and 41 are arranged. The circuit configuration of each MR element is common to the detecting element pairs 31, 32 and 33.

Figure 2:
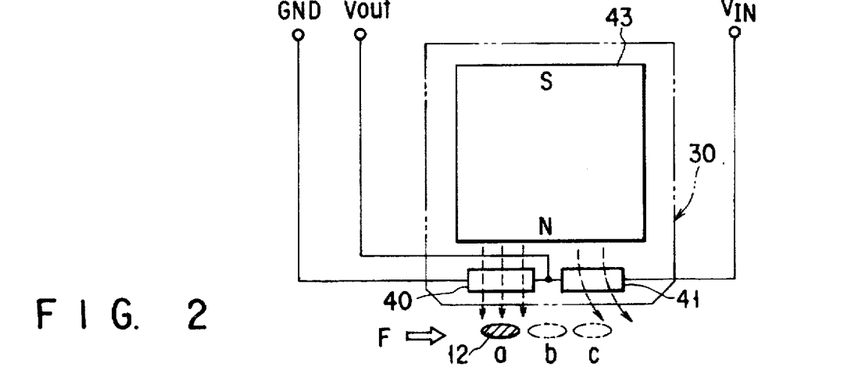
FIG. 2 is a schematic view showing the operation of part of the sensor shown in FIG. 1.

When the magnetic pieces 12 pass by the MR elements 40 and 41, as is conceptually shown in FIG. 2, an output voltage $V_{out}$ changes as the pieces 12 shift their positions, a, b and c. Thus, when none of the magnetic pieces 12 exist in the vicinity of the MR elements 40 and 41, the magnetic fields of the magnet 43 are applied equally to the elements 40 and 41, so that the respective resistances of the elements 40 and 41 are equal. Accordingly, the output voltage $V_{out}$ is about half ($V_{in}/2$) of an input voltage $V_{in}$. When the magnetic pieces 12 pass by the MR elements 40 and 41 as they move in the direction of arrow F, magnetic fluxes which pass through the elements 40 and 41 change with time, depending on the positions of the magnetic pieces 12, and the resistances of the elements 40 and 41 differ from each other. Thus, the output voltage $V_{out}$ fluctuates in the vicinity of about $V_{in}/2$.

If the resistances of the MR elements 40 and 41 are $R_1$ and $R_2$, respectively, the output voltage $V_{out}$ is given by $$V_{out} = V_{in} \times \{R_1/(R_1+R_2)\}.$$

The output voltage $V_{out}$ varies depending on the distribution density of the magnetic pieces 12 and the state of distribution of the pieces 12, including the diameter (or width), length, direction, etc., so that an output voltage pattern of a proper waveform can be detected.

The processing apparatus 20 comprises the controller 50, including, for example, a microcomputer which functions as processing means for processing the detection signal, a code write section 51 for recording a cipher code (mentioned later) in the code indicator section 18 of the object 10 to be checked, a code read section 52 for reading the cipher code from the indicator section 18, etc. The code write and read sections 51 and 52 are connected to a read/write circuit 53. The controller 50 includes an analog-to-digital converter 60, comparator 61, cipher code converter 62, etc. A display 65 is connected to the controller 50.

The controller 50 is provided with a circuit 66 for use as switching means which is designed so that the controller 50 fetches a detection signal from the first detecting element pair 31 in manufacturing or issuing the object 10 to be checked, and fetches detection signals from the first and second detecting element pairs 31, 32 and 33 in collating the object 10.

The following is a description of the operation of the processing apparatus 20.

Figure 6:
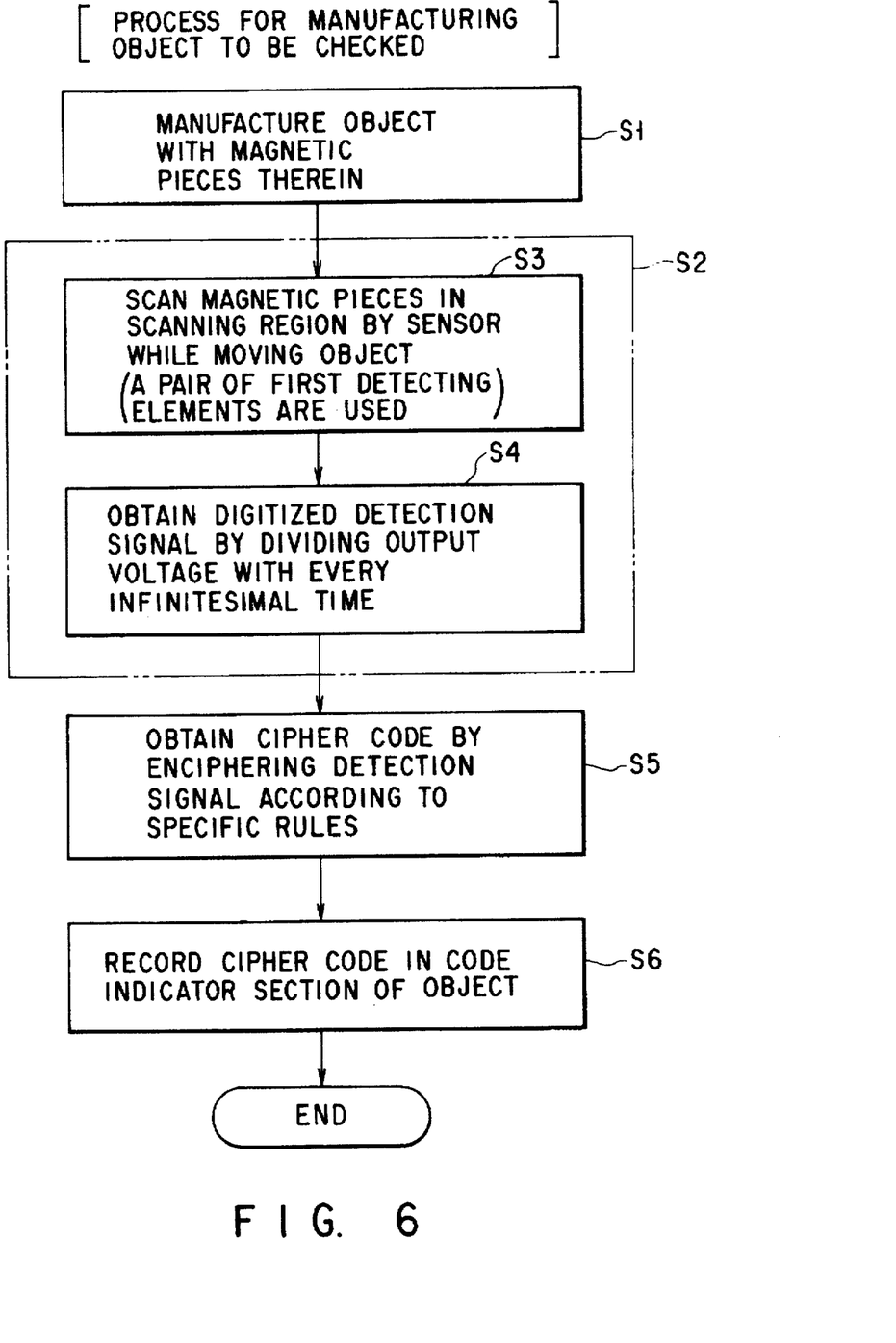
FIG. 6 is a flowchart showing steps of a process for manufacturing the object to be checked.

FIG. 6 shows an outline of a process for manufacturing the object 10 to be checked. In manufacturing the base 11 of the object 10 in Step S1, the magnetic pieces 12 are distributed into the base 11. In the case where the magnetic pieces 12 are formed of powder, the scanning region 17 is shaded at random with a gradation of powder density or decorated with a random pattern without varying the powder density, or these alternative methods are combined.

In Step S2 for scanning and detection, which includes Step S3 for scanning and Step S4 for detection, a detection signal corresponding to the scanning region 17 is obtained as the object 10 to be checked is moved at the predetermined speed in the direction of arrow F by the transfer mechanism 26.

More specifically, when the object 10 is moved at the predetermined speed in the direction of arrow F by the transfer mechanism 26 in Step S3 for scanning, a plurality of infinitesimal portions of the scanning region 17 pass by the MR elements 40 and 41 in succession. At this time, the magnetic fluxes which pass through the elements 40 and 41 change with time, depending on the state of distribution of the magnetic pieces 12, so that the resistances $R_1$ and $R_2$ of the elements 40 and 41 differ from each other. Thus, the output voltage $V_{out}$ can be measured as proper output voltage patterns.

The aforesaid detection signal is divided with every infinitesimal time, and output voltages for the individual infinitesimal times are ranked in a plurality of stages and converted into digital values. In this manner, an encoded detection signal proper to the scanning region 17 can be obtained. In this manufacturing process, the controller 50 fetches the detection signal from the first detecting element pair 31. In the case where the first detecting element pair 31 and only the one second detecting element pair 32 is used, one detection waveform may be created, for example, by interpolating two detection waveforms obtained by means of the first and second detecting element pairs 31 and 32, in the aforesaid manufacturing process.

In Step S5 for encipherment, the detection signal is enciphered according to specific rules by a cipher code converter 62. In Step S6 for writing, the resulting cipher code is recorded in the code indicator section 18 by a magnetic head of the code write section 51. Although the code indicator section 18 according to the present embodiment is a magnetic strip, the cipher code may alternatively be recorded in the form of a bar code in the indicator section 18 by means of a printing head, for example. Alternatively, moreover, the cipher code may be stored in a code storage memory of a host computer.

Figure 7:
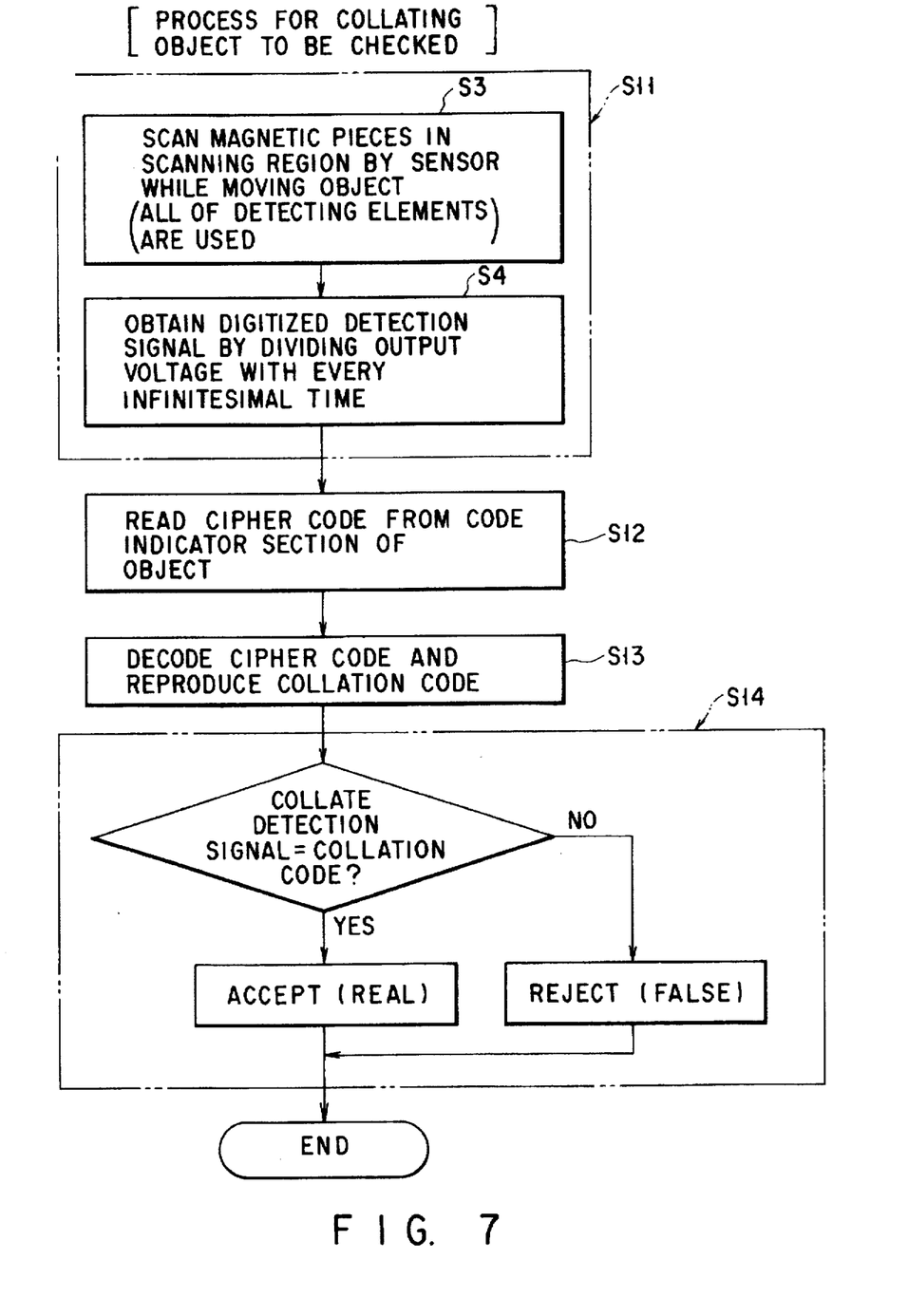
FIG. 7 is a flowchart showing steps of a process for collating the object to be checked.

The processing apparatus 20 is also used to check the object 10 for authenticity. FIG. 7 shows an outline of a collating process for checking the object 10 for authenticity. In Step S11, which, like the aforesaid manufacturing process for the object 10, includes Step S3 for scanning and Step S4 for detection, a detection signal corresponding to the distribution of the magnetic pieces 12 and the like is obtained by scanning the scanning region 17 at a predetermined speed by means of the sensor 30. In this case, the circuit 66 operates in a manner such that the controller 50 fetches the detection signals from the first detecting element pair 31 and the second detecting element pairs 32 and 33.

In Step S12 for reading, the cipher code recorded in the code indicator section 18 is read by the code read section 52. When this cipher code is decoded according to specific rules by the cipher code converter 62 in Step S13 for code reproduction, a collation code is reproduced. In Step S14 for decision, the three detection signals are compared with the collation code by the comparator 61. If the difference of at least one of the detection signals from the collation code is within an allowable range, the object 10 is concluded to be real, and the collation result is indicated on the display 65.

According to the processing apparatus 20 described above, as compared with the case where the first detecting element pair 31 alone is used singly, the allowable deviation range for the sensor 30 can be extended by a margin for the second detecting element pairs 32 and 33 at the time of collation. Accordingly, the sensor 30 need not be aligned with high accuracy, so that the processing apparatus 20 can be manufactured with ease. In the case where the first detecting element pair 31 and only the one second detecting element pair 32 is provided, the two detection signals detected by the detecting element pairs 31 and 32 are compared with the collation code in Step S14 for decision. If the difference of either of these detection signals from the collation code is within the allowable range, the object 10 is concluded to be real.

Figure 8:
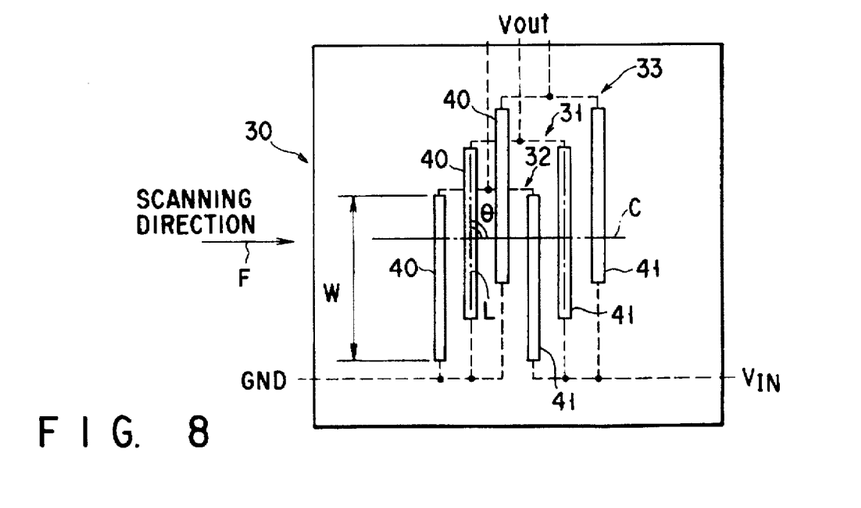
FIG. 8 is a plan view showing a modification of the sensor.

As in the sensor 30 shown in FIG. 8, the elements 40 and 41 of a plurality of detecting element pairs 31, 32 and 33 may be arranged so that they are mingled with one another. According to this arrangement, a plurality of detecting element pairs can be formed into a compact structure, and the manufacturing cost can be lowered. When the code storage memory of the host computer is registered with the cipher code, in the aforesaid manufacturing process for the object 10 to be checked, the cipher code may be invoked from the host computer and collated with the detection signals in the collating process. Alternatively, the detection signal obtained in Step S4 for detection may be enciphered in the collating process, according to the same rules for the manufacturing process. In this case, the resulting cipher code is collated with the cipher code read in Step S12 for code reading.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for checking an object to be checked for authenticity, the object having a scanning region in which a large number of magnetic pieces of a magnetic material are distributed at random in a base of a nonmagnetic material, said apparatus comprising:

a magnetic detector including a sensor for magnetically detecting the magnetic pieces; and a transfer mechanism for moving the object relatively to the sensor in a scanning direction in which the magnetic pieces in the scanning region are scanned, the sensor having a first detecting element pair including a first pair of magneto-electric transducers arranged adjacent to each other so that longitudinal center lines thereof cross a line along the scanning direction, and a second detecting element pair including a second pair of magneto-electric transducers arranged in a vicinity of the first detecting element pair so that the second detecting element pair is deviated from the first detecting element pair in parallel relation, and the magnetic detector further including a magnetic field generator for applying magnetic fields to the first and second detecting element pairs, a detecting circuit for detecting changes of electrical outputs produced in the individual detecting element pairs and obtaining detection signals as the magnetic pieces in the scanning region pass by the detecting element pairs, a switch for delivering a first detection signal from the first detecting element pair into the detecting circuit when issuing the object to be checked and delivering second detection signals from the first and second detecting element pairs into the detecting circuit when collating the object, a code write section for recording data associated with the first detection signal from the first detecting element pair in a code indicator section, a code read section for reading the data from the code indicator section, and a processor for collating the data of the code indicator section read by the code read section with the second detection signals from the first and second detecting element pairs and concluding that the object to be checked is real if any of the second detection signals corresponds to the data of the code indicator section.

2. A method for checking an object to be checked for authenticity, the object having a scanning region in which a large number of magnetic pieces of a magnetic material are distributed at random in a base of a nonmagnetic material, said method comprising:

a manufacturing process for manufacturing the object to be checked and a collating process for checking the object, wherein a processing apparatus used in the manufacturing and collating processes includes a sensor having a first detecting element pair including a first pair of magneto-resistance elements arranged in a scanning direction and a second detecting element pair including a second pair of magneto-resistance elements deviated from the first pair of magneto-resistance elements of the first detecting element pair in parallel relation, the manufacturing process including a scanning step for applying magnetic fields to the first detecting element pair while moving the scanning region relatively to the sensor, a detecting step for detecting a change of an electrical output produced in the first detecting element pair and obtaining a first detection signal as the magnetic pieces in the scanning region pass by the first detecting element pair, and a step for recording data associated with the first detection signal in a code indicator section, and the collating process including a scanning step for applying magnetic fields to the first and second detecting element pairs while moving the scanning region relatively to the sensor, a detecting step for detecting changes of electrical outputs produced in the first and second detecting element pairs and obtaining second detection signals as the magnetic pieces in the scanning region pass by the detecting element pairs, and a decision step for comparing the second detection signals with the data recorded in the code indicator section and concluding that the object to be checked is real if the difference of at least one of the second detection signals from the data recorded in the code indicator section is within an allowable range.

3. An apparatus for checking an object to be checked for authenticity, the object having a scanning region in which a large number of magnetic pieces of a magnetic material are distributed at random in a base of a nonmagnetic material, said apparatus comprising:

a sensor for magnetically detecting the magnetic pieces, the sensor having a first detecting element pair including a first pair of magneto-electric transducers arranged adjacent to each other so that longitudinal center lines thereof cross a line along which the magnetic pieces in the scanning region are scanned, and a second detecting element pair including a second pair of magneto-electric transducers arranged in a vicinity of the first detecting element pair so that the second detecting element pair is deviated from the first detecting element pair in parallel relation;

wherein said magneto-electric transducers of the first and second detecting element pairs are magneto-resistance elements; and wherein a deviation distance of the second detecting element pair from the first detecting element pair ranges from 7% to 20% of a length of each magneto-resistance element.

4. The apparatus according to claim 3, further comprising another second detecting element pair comprising a third pair of magneto-electric transducers arranged in a vicinity of the first detecting element pair such that the two second detecting element pairs are deviated oppositely at equal distances from the first detecting element pair.

* * * * *